US006352004B1

(12) United States Patent
Greppmair

(10) Patent No.: US 6,352,004 B1
(45) Date of Patent: Mar. 5, 2002

(54) WORKING DEVICE WITH MASS BALANCING AT THE CRANK MECHANISM

(75) Inventor: Martin Greppmair, Munich (DE)

(73) Assignee: Wacker-Werke GmbH & Co. KG, Munich (DE)

( * ) Notice: Subject to any disclaimer, the term of this patent is extended or adjusted under 35 U.S.C. 154(b) by 0 days.

(21) Appl. No.: 09/486,840

(22) PCT Filed: Aug. 25, 1998

(86) PCT No.: PCT/EP98/05391

§ 371 Date: Mar. 1, 2000

§ 102(e) Date: Mar. 1, 2000

(87) PCT Pub. No.: WO99/13165

PCT Pub. Date: Mar. 18, 1999

(30) Foreign Application Priority Data

Sep. 10, 1997 (DE) .......................................... 197 39 742

(51) Int. Cl.$^{7}$ .......................... F16H 21/22; E01C 19/35

(52) U.S. Cl. ............................... 74/44; 74/603; 74/604; 173/202; 404/133.1

(58) Field of Search ............................ 74/44, 603, 604; 173/202; 404/133.1

(56) References Cited

U.S. PATENT DOCUMENTS

| | | | | |
|---|---|---|---|---|
| 3,007,230 A | * 11/1961 | Riedl | ........................ | 74/44 X |
| 3,308,729 A | 3/1967 | Kestel | | |
| 3,626,768 A | * 12/1971 | Dancsik | ......................... | 74/44 |
| 3,856,426 A | 12/1974 | Waschulewski et al. | | |
| 4,991,664 A | * 2/1991 | Kolgan et al. | .............. | 173/201 |

FOREIGN PATENT DOCUMENTS

| | | |
|---|---|---|
| DE | 1 925 870 | 11/1970 |
| DE | 2 236 371 | 10/1973 |
| DE | 35 32 174 A1 | 3/1987 |
| DE | 43 07 993 C2 | 9/1997 |

* cited by examiner

*Primary Examiner*—Allan D. Herrmann
(74) *Attorney, Agent, or Firm*—Boyle Frederickson Newholm Stein & Gratz S.C.

(57) ABSTRACT

A working device, especially a ramming device for compacting soil, or a hammer, has a crank mechanism for producing a controlled vibration. The crank mechanism is coupled with a set of springs. According to the invention, the crank disk belonging to the crank mechanism is provided with a counter-mass whose center of gravity is shifted around an angle not equal to 180° from the center of gravity of a crank pin on the crank disk, in relation to the axis of rotation of the crank disk. This prevents vibrations which would be unpleasant for the person operating the device from occurring.

19 Claims, 2 Drawing Sheets

WORKING DEVICE WITH MASS BALANCING AT THE CRANK MECHANISM

BACKGROUND OF THE INVENTION

1. Field of the Invention

The invention relates to a working device. In particular, the invention relates to working devices such as a ramming device for compacting soil or a hammer.

2. Description of the Related Art

Known ramming devices of this kind are constructed in such a way that an upper mass which accommodates a motor and a crank mechanism is connected via a set of springs to a working mass essentially forming a working or compacting plate. The rotary motion produced by the motor is converted by the crank mechanism into an oscillating axial motion, which is transmitted via the set of springs to the working plate for the purpose of compacting the soil. The upper mass comprises approximately two thirds and the percussive working mass one third of the total mass of the ramming device, while the respective distances traveled by the upper mass and the working mass are inversely proportional to one another. In this arrangement, the movement of the upper mass is of the order of 25 to 30 mm.

The vibrations of the upper mass are transmitted via a guide hoop to the person guiding the working device and this is very unpleasant, particularly when working for a prolonged period. In this context, vibrations in the horizontal or lateral direction are particularly stressful for the operator. Vibrations in the vertical direction, on the other hand, are necessary for the ramming device to work effectively.

FIG. 2 shows a known ramming device of this kind.

According to the invention, the object is achieved by providing a working device, such as a ramming device for compacting soil or a hammer, that includes a working mass which can be driven backwards and forwards in a linear manner by a motor belonging to an upper mass via a single crank mechanism and a set of springs. The crank mechanism has a crank disk which is driven by the motor and which, eccentrically with respect to its axis of rotation, carries a crank pin. The crank pin is coupled to a connecting rod. The working device also includes a countermass which is carried by the crank disk and which has a center of gravity that is offset from the center of gravity of the crank pin by an angle unequal to 180° relative to the axis of rotation of the crank disk.

Arranged on both sides of the piston guide 9 is a set of springs 11 comprising a plurality of springs, the springs each being supported, at their end remote from the piston guide 9, against spring plates 12 secured on the guide tube 10.

The guide tube 10 and the spring plates 12 belong to the working or lower mass of the ramming device. A ramming foot (not shown in FIG. 2), for compacting the soil can be attached to the lower mass. To prevent the ingress of moisture and dirt, the upper mass and the lower mass are connected by a flexible bellows 13.

As can be seen from FIG. 2, the rotary motion of the motor is converted into an oscillating axial motion of the guide piston 7 by the crank mechanism comprising the crank disk 3, the crank pin 4 and the connecting rod 5. This axial motion is transmitted to the guide tube 10 and hence to the lower mass by the set of springs 11 and can be used to compact soil.

The previously known method of damping the vibrations acting on the operator was to decouple the guide hoop from the upper mass mechanically by means of rubber elements.

However, the attached drive motor is still subject to high vibrational loading. In this arrangement, it is only possible to improve the vibration damping by highly complex construction.

It is therefore desirable to avoid the occurrence of vibrations of the upper mass from the outset.

DE-A 19 25 870 has disclosed a ramming device in which the drive power of the motor is divided between two crank mechanisms which act simultaneously on a working mass via sets of springs. Countermasses are secured on the crank mechanisms, which rotate in opposite directions, the centrifugal forces of these countermasses balancing one another in the horizontal direction but are added to one another in the vertical direction, thereby reducing the vibration amplitude of the housing of the ramming device. With this device too, however, horizontal vibrations that are stressful for the operator occur.

OBJECTS AND SUMMARY OF THE INVENTION

The object underlying the invention is therefore to specify a working device in which it is possible to reduce horizontal vibrations of the upper mass right at their inception.

According to the invention, the object is achieved by a working device with the features of patent claim 1.

It has surprisingly been found that balancing the crank mechanism, i.e. providing the crank disk carrying the crank pin with a countermass which balances the mass of the crank pin does not lead to the desired improvement in terms of a reduction in the horizontal vibrations of the upper mass. On the contrary, it was found as a complete surprise that it is only possible to reduce the horizontal vibrations effectively if, instead of the center of gravity of the crank pin, the axis of rotation of the crank drive and the center of gravity of the countermass lying on a straight line and the center of gravity thus being offset by 180° relative to the axis of rotation of the crank disk, the center of gravity of the countermass is arranged offset from the center of gravity of the crank pin by an angle unequal to 180° relative to the axis of rotation of the crank disk.

Although this means that the crank mechanism, taken by itself, generates considerable vibrations, these are superimposed on the vibrations generated by the following components, in particular the guide piston and the spring assemblies, and these vibrations essentially compensate for one another. Consequently, the superimposition of the vibrations leads to considerable stabilization of the upper mass, especially in the horizontal direction.

In a preferred embodiment, the mass and the angular offset of the countermass can be adjusted in such a way, as a function of the characteristics of the set of springs, that the vibrations which are not directed in a working or vertical direction of the working device are minimal. This is possible, for example, during the manufacture or assembly of the crank disk, it being possible to provide an appropriate angular arrangement of the countermass of suitable mass depending on the set of springs used.

In a particularly preferred embodiment, the countermass is formed in one piece with the crank disk. This simplifies assembly and production. An appropriate casting mold can be used when casting the crank disk or an appropriate die when forging the crank disk, this depending on the production method.

In another preferred embodiment, the countermass can be secured on the crank disk. It is particularly advantageous here if the countermass can be secured at various points on the crank disk relative to the crank pin in terms of its angle around the axis of rotation. This has the advantage that fine adjustments can be performed during assembly, leading to a further reduction in the horizontal vibrations of the upper mass. It is likewise possible, without changing the molds or dies used in production, to match the crank disk and the countermass individually to one another, depending on the various sets of springs fitted.

It has proved expedient if the difference between the offset angle and 180° is at least 10°.

In a particularly advantageous embodiment of the invention, the angle between the center of gravity of the countermass and the center of gravity of the crank pin is about 90° relative to the axis of rotation of the crank disk.

It has likewise proven expedient if the mass of the countermass is essentially equal to the mass of the crank pin.

In another embodiment of the invention, the mass of the countermass is greater, indeed preferably considerably greater, than that of the crank pin.

This makes it possible to use the countermass to balance the moving masses of the connecting rod, the guide piston and the piston guide as well.

BRIEF DESCRIPTION OF THE DRAWINGS

These and further features of the invention are explained in greater detail below with reference to the figures, in which.

DETAILED DESCRIPTION OF THE PREFERRED EMBODIMENTS

Figure 1:
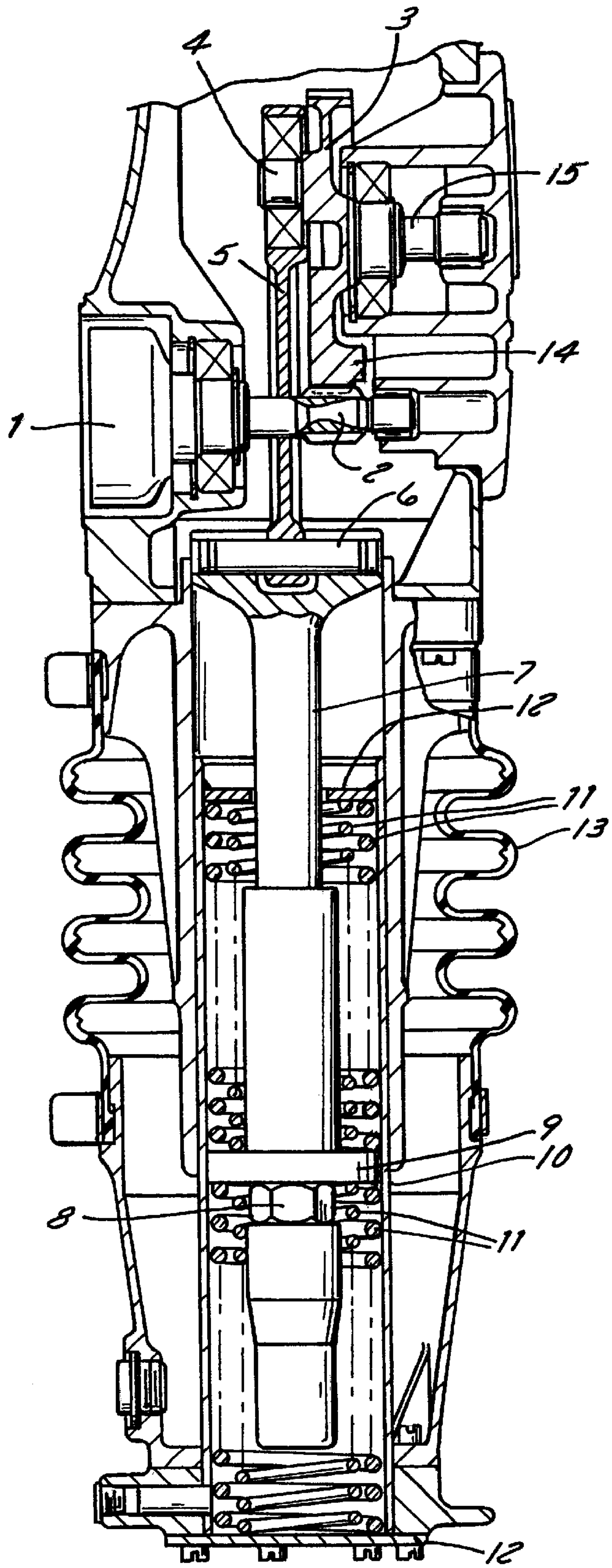
FIG. 1 shows part of a ramming device according to the invention in sectional representation and FIG. 2 shows a partial section of a known ramming device.

Since significant components of the ramming device according to the invention shown in FIG. 1 correspond to the known elements already described with reference to FIG. 2, they will not be described again. For the sake of simplicity, identical reference numerals are used for identical components in the figures.

Figure 2:
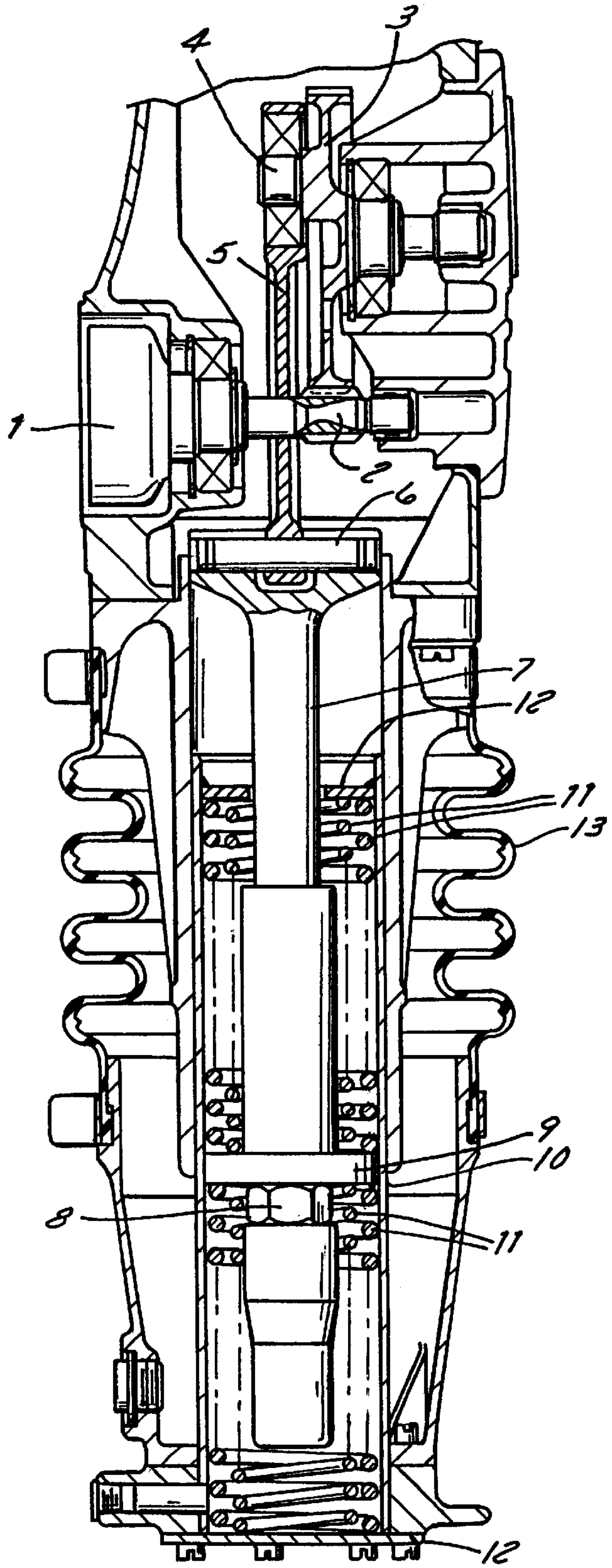
FIG. 2 PRIOR ART

The essential difference between the known ramming device shown in FIG. 2 and the ramming device according to the invention shown in FIG. 1 is that, in the invention, the crank disk 3 carries a countermass 14. Although this cannot readily be seen in FIG. 1, the center of gravity of the countermass 14 is not arranged opposite the crank pin 4 relative to an axis of rotation 15 of the crank disk 3, which would correspond to an offset angle of 180°, but at an angle unequal to 180°. Depending on the embodiment, the offset angle should deviate by at least 10° from 180°, i.e. should be less than 170° or greater than 190°. The centers of gravity of the countermass 14, the crank pin 4 and the axis of rotation 15 thus do not lie on a straight line. An angular offset of 90° between the two centers of gravity has been found to be a particularly expedient angle in this context. In this case, the phase angle of a centrifugal force generated by the mass of the crank pin 4 during rotation of the crank disk 3 and the phase angle of a centrifugal force generated by the countermass 14 are offset by an angle of 90°, with the result that the centrifugal forces do not cancel each other out, which would be the case with an angular offset of 180° and a correspondingly equal mass. On the contrary, the crank mechanism thus generates a resultant force which is superimposed on other forces generated essentially by the connecting rod 5, the guide piston 7 and the sets of springs 11, leading overall to stabilization of the upper mass.

In the embodiment shown in FIG. 1, the countermass 14 is produced in one piece with the crank disk 3, e.g. by forging. The crank pin 4 has likewise been connected in one piece to the crank disk 3 and machined to produce a bearing seat. To clarify the terms used, it is pointed out that the crank disk 3 has essentially three elements: an essentially balanced carrier disk, which carries the spindle 15 and, if required, is provided with external teeth, the crank pin 4 and the countermass 14. The countermass 14 can, for example, comprise a plurality of individual masses secured at various points on the carrier disk.

In an embodiment of the invention which is not shown, the crank disk 3 is constructed as in the prior art but has a means of securing the countermass 14. The countermass 14 can be attached at various angular positions and radii, depending on the application, and have different masses depending on the vibration characteristics of the device overall.

So far, a ramming device for compacting soil has been described as an example of a working device according to the invention. However, the invention can also be used to advantage with a hammer, in particular a paving breaker. A paving breaker generally has a pneumatic-spring impact mechanism instead of the steel springs forming the set of springs 11 in the ramming device. The generation of the directional vibration by means of a crank drive takes place essentially as described above, however.

What is claimed is:

1. A working device comprising:

a working mass which can be driven backwards and forwards in a linear manner by a motor belonging to an upper mass via a single crank mechanism and a set of springs, the crank mechanism having a crank disk which is driven by the motor and, eccentrically with respect to its axis of rotation, carries a crank pin and a countermass, the crank pin being coupled to a connecting rod, wherein the center of gravity of the countermass is offset from the center of gravity of the crank pin by an angle unequal to 180° relative to the axis of rotation of the crank disk.

2. The working device as claimed in claim 1, wherein the mass and the angular offset of the countermass can be adjusted as a function of the characteristics of the set of springs, such that the vibrations which are not directed in a working direction of the working device are minimal.

3. The working device as claimed in claim 1, wherein the countermass is formed in one piece with the crank disk.

4. The working device as claimed in claim 1, wherein the countermass can be secured on the crank disk.

5. The working device as claimed in claim 4, wherein the countermass can be secured at various points on the crank disk relative to the crank pin in terms of its angle around the axis of rotation of the crank disk.

6. The working device as claimed in claim 1 wherein the difference between the offset angle and 180° is at least 10°.

7. The working device as claimed in claim 1, wherein the angle between the center of gravity of the countermass and the center of gravity of the crank pin is about 90° relative to the axis of rotation of the crank disk.

8. The working device as claimed in claim 1, wherein the mass of the countermass is essentially equal to the mass of the crank pin.

9. The working device as claimed in claim 1, wherein the mass of the countermass is greater than the mass of the crank pin.

10. The device as claimed in claim 2, wherein the countermass is formed in one piece with the crank disk.

11. A ground impacting device for compacting soil, the ground impacting device comprising:

(A) a crank mechanism including a crank disk which is driven by a motor coupled to an upper mass and which, eccentrically with respect to an axis of rotation of the crank disk, carries a crank pin and a countermass, wherein the center of gravity of the countermass is offset from the center of gravity of the crank pin by an angle unequal to 180° relative to the axis of rotation of the crank disk, and a connecting rod which is coupled to the crank pin;

(B) a set of springs; and (C) a working mass which can be driven backwards and forwards in a linear manner by the motor via the crank mechanism and the set of springs.

12. The ground impacting device as claimed in claim 11, wherein the mass and the angular offset of the countermass are adjustable as a function of the characteristics of the set of springs, such that the vibrations which are not directed in a working direction of the ground impacting device are minimized.

13. The ground impacting device as claimed in claim 11, wherein the countermass is formed in one piece with the crank disk.

14. The ground impacting device as claimed in claim 11, wherein the countermass is securable on the crank disk.

15. The ground impacting device as claimed in claim 14, wherein the countermass is securable at various points on the crank disk relative to the crank pin in terms of the its angle around the axis of rotation of the crank disk.

16. The ground impacting device as claimed in claim 11, wherein the difference between the offset angle and 180° is at least 10°.

17. The ground impacting device as claimed in claim 11, wherein the angle between the center of gravity of the countermass and the center of gravity of the crank pin is about 90° relative to the axis of rotation of the crank disk.

18. The ground impacting device as claimed in claim 11, wherein the mass of the countermass is essentially equal to the mass of the crank pin.

19. The ground impacting device as claimed in claim 11, wherein the mass of the countermass is greater than the mass of the crank pin.

* * * * *